United States Patent
Fukushima

[11] Patent Number: 6,048,102
[45] Date of Patent: *Apr. 11, 2000

[54] OPTICAL CONNECTOR WHICH PROVIDES A DISCONNECTION STATE BETWEEN TWO OPTICAL FIBERS WHERE LIGHT IS TOTALLY REFLECTED AT AN END FACE OF ONE FIBER

[75] Inventor: Nobuhiro Fukushima, Kawasaki, Japan

[73] Assignee: Fujitsu Limited, Kawasaki, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/632,361

[22] Filed: Apr. 11, 1996

[30] Foreign Application Priority Data

Nov. 20, 1995 [JP] Japan .................................. 7-301443

[51] Int. Cl.⁷ ...................................................... G02B 6/38
[52] U.S. Cl. ............................... 385/72; 385/60; 385/140
[58] Field of Search ............................ 385/70–73, 76–78, 385/58, 60, 66, 140

[56] References Cited

U.S. PATENT DOCUMENTS

| | | |
|---|---|---|
| 4,615,581 | 10/1986 | Morimoto .................................. 385/60 |
| 4,893,889 | 1/1990 | Iwakiri et al. ....................... 385/140 X |
| 5,066,094 | 11/1991 | Takahashi ................................. 385/73 |
| 5,082,378 | 1/1992 | Müller et al. ............................... 385/72 |
| 5,136,681 | 8/1992 | Takahashi et al. ....................... 385/140 |
| 5,214,730 | 5/1993 | Nagasawa et al. .................... 385/71 X |
| 5,459,806 | 10/1995 | Hultermans ............................ 385/78 X |

FOREIGN PATENT DOCUMENTS

| | | |
|---|---|---|
| 5-205188 | 8/1993 | Japan . |
| 5-273431 | 10/1993 | Japan . |
| 5-288957 | 11/1993 | Japan . |
| 5-323151 | 12/1993 | Japan . |
| 6-331940 | 12/1994 | Japan . |

*Primary Examiner*—John D. Lee
*Attorney, Agent, or Firm*—Staas & Halsey

[57] ABSTRACT

An optical connector including first and second optical fibers which each has a slanted end face. The optical connector provides a connection state where the end face of the first optical fiber is aligned with, and in close contact with, the end face of the second optical fiber so that light travelling through the first optical fiber travels into the second optical fiber. Moreover, the optical connector provides a disconnection state where a gap exists between the end face of the first optical fiber and the end face of the second optical fiber. The end face of the first optical fiber causes light travelling through the first optical fiber to be totally reflected at the end face of the first optical fiber when in the disconnection state.

24 Claims, 9 Drawing Sheets

OPTICAL CONNECTOR WHICH PROVIDES A DISCONNECTION STATE BETWEEN TWO OPTICAL FIBERS WHERE LIGHT IS TOTALLY REFLECTED AT AN END FACE OF ONE FIBER

BACKGROUND OF THE INVENTION

1. Field of the Invention

The present invention relates to optical connectors, and more particularly to an optical connector disposed at an end of an optical fiber transmission line.

An optical connector is disposed at an end of an optical fiber cord and is connected to an associated device. When the device is maintained, the optical connector is disconnected therefrom. When the optical connector is disconnected from the device, a laser beam emitted by a semiconductor laser and transmitted through the optical fiber is emitted from the end. When one observes the disconnected optical connector, the emitted laser light may damage the eyes of the observer.

It is expected that optical fiber transmission lines reach households of ordinary people in the near future. When people who are not experts perform connection and disconnection of an optical connector to and from a device, they may observe the end of a disconnected optical connector. Accordingly, an extra amount of safety measures must be taken.

Subscriber optical fiber transmission lines that reach ordinary households may not usually be made of a glass but of a plastic. Most probably, optical fibers having a core whose diameter is as large 1 mm may be used. The above-mentioned safety measures must take into account this fact.

2. Description of the Prior Art

FIGS. 1 and 2 show an optical connector 10 shown in Japanese Laid-Open Patent Application No. 5-288957. The optical connector 10 is constructed such that a ferrule composite 12 is built in a substantially cylindrical housing 11. The optical connector 10 is adapted for a single mode fiber which is used widely in optical communication. A single mode fiber is made of a glass and its core has a diameter of 10 $\mu$m.

The ferrule composite 12 is generally constructed such that a first ferrule 14, a second ferrule 15 and a coil spring 16 are built in a cylinder 13. An optical fiber 18 at the end of an optical fiber cord 17 is inserted into the first ferrule 14 fixed therein. An optical fiber 19 is inserted into the center of the second ferrule 15 and fixed therein. The second ferrule 15 is disposed before the first ferrule 14 so as to be aligned therewith and axially displaceable. The coil spring 16 is provided between the first ferrule 14 and the second ferrule 15 so as to urge the second ferrule 15 in the X1 direction, that is, toward the outside of the cylinder 13.

As shown in FIG. 2, in a state in which the optical connector 10 is coupled to a device, the second ferrule 15 is pressed toward a ferrule 20 of the device. The coil spring 16 is compressed and displaced in the X2 direction with respect to the cylinder 13. As a result, an end surface 21 of the second ferrule 15 comes into a close contact with an end surface 22 of the first ferrule 14. A laser beam transmitted through the optical fiber cord 17 passes through the close contact portion and enters an optical fiber 19 in the second ferrule 15. After passing through the optical fiber 19, the beam enters an optical fiber 23 in the ferrule 20 in the device.

When the optical connector 10 is disconnected from the device, the ferrule composite 12 returns to a state shown in FIG. 1. More specifically, the second ferrule 15 is displaced by a distance of L1 in the X1 direction with respect to the cylinder 13 so that the end surface 21 of the second ferrule 15 is detached from the end surface 22 of the first ferrule 14.

The laser beam that left a semiconductor laser apparatus (light source) and is transmitted through the optical fiber cord 17 is diverged at the end surface 22 of the first ferrule 14 and emitted outside the optical cord 17.

It is to be noted that the optical fibers 18, 19 and 20 are usually made of a glass and are extremely thin. Referring to FIG. 3, the diameter d1 of a core 24 of the optical fibers 18, 19 and 20 is usually 10 $\mu$m. Therefore, even if the distance L1 is as small as 0.1 mm, only a limited portion of a laser beam 25 diverged at the end surface 22 of the first ferrule 14 and emerging therefrom enters the optical fiber 19 of the second ferrule 15. In this way, the optical intensity of the beam that emerges from the other end of the second ferrule 15 is reduced to a degree that it does not hurt naked eyes.

However, the following problem arises if the conventional optical connector 10 is applied to a subscriber optical fiber line.

An optical fiber 30 predictably used in the subscriber loop system is made of a plastic. As shown in FIG. 4, the diameter d2 of a core 31 is as large as 1 mm. For this reason, a major portion of the laser beam 32 diverged at an end surface 22A of a first ferrule 14A and emerging therefrom enters a core 34 of an optical fiber 53 of a second ferrule 15A, even if a separation L2 of 1 mm is allowed to exist between the first ferrule 14A and the second ferrule 15A. Therefore, it is difficult to reduce the light intensity of the beam emerging from the other end of the second ferrule 15A to a satisfactorily low level. Extending of the separation L2 between the first ferrule 14A and the second ferrule 15A to, for example, 10 mm enlarges the degree of reduction of the light intensity. However, such an arrangement causes the size of the optical connector to be great and is not practical.

SUMMARY OF THE INVENTION

Accordingly, an object of the present invention is to provide optical connectors in which the aforementioned problem is eliminated.

Another and more specific object of the present invention is to provide an optical connector configured such that light is prevented from emerging from an end of the optical connector when the optical connector is disconnected from an associated device.

The present invention achieves these objects by providing an optical connector comprising a ferrule composite built into a connector housing, said ferrule composite comprising:
  a housing;
  a first ferrule fixed in said housing and having fixed therein a first optical fiber extending from an end of an optical fiber cord;
  a second ferrule having fixed therein a second optical fiber and disposed in said housing so as to be axially aligned with said first ferrule and axially displaceable; and
  energizing means for energizing said second ferrule away from said first ferrule,
  said second ferrule being in a close contact with said first ferrule in a connected state and being removed from said first ferrule in a disconnected state by said energizing means,
  said first ferrule having a slanting end surface slanting in such a manner that a light beam transmitted through a core of the first optical fiber is totally reflected, and said second ferrule having a slanting end surface that corresponds to the slanting end surface of the first ferrule.

According to the optical connector of the present invention, since the slanting end surface of the first ferrule matches the slanting end surface of the second ferrule, a gap is created between the slanting end surface of the first ferrule and the slanting end surface of the second ferrule in a disconnected state. Therefore, a light beam transmitted through a core of the first optical fiber is totally reflected by the slanting end surface of the first ferrule and is not propagated beyond it. In this way, it is possible to prevent the light beam from emerging from an end of the disconnected optical connector. Therefore, no damage is caused to the eyes even when a lay person performs a disconnection operation and looks into the end of the disconnected optical connector. In this way, the present invention ensures a safe disconnection operation.

The invention as claimed in claim 1 is most suitably applied to an optical fiber used in a subscriber loop system. Such an optical fiber has a relatively large core diameter of about 1 mm and is characterized by a difficulty to prevent a light beam from being propagated over a gap between connected ends of optical fibers unlike a case of an extremely thin single-mode optical fiber which has an extremely thin, for example, 0.1 mm, core diameter. By applying the present invention, it is possible to reduce the size, particularly the lengthwise dimension, of an optical connector.

In a preferred embodiment of the optical connector, a light absorbing part is provided in a portion of the first optical fiber upon which portion the light beam transmitted through the core of the first optical fiber of the optical fiber cord and totally reflected by said slanting end surface of the first ferrule impinges.

According to this aspect of the present invention, it is possible to properly absorb the laser beam which is totally reflected. Hence, any problem that might occur as a result of the total reflection, such as a problem of a return beam traveling back through the first optical fiber can be prevented. Thus, unfavorable effects on the optical communication can be prevented.

Preferably, the ferrule composite has rotation restricting mechanism for restricting rotation of the second ferrule around its axis.

According to this aspect of the present invention, the slanting end surface of the second ferrule can be in close contact with the slanting end surface of the first ferrule in a connected state.

BRIEF DESCRIPTION OF THE INVENTION

Other objects and further features of the present invention will be apparent from the following detailed description when read in conjunction with the accompanying drawings, in which.

DESCRIPTION OF THE PREFERRED EMBODIMENTS

Figure 1A:
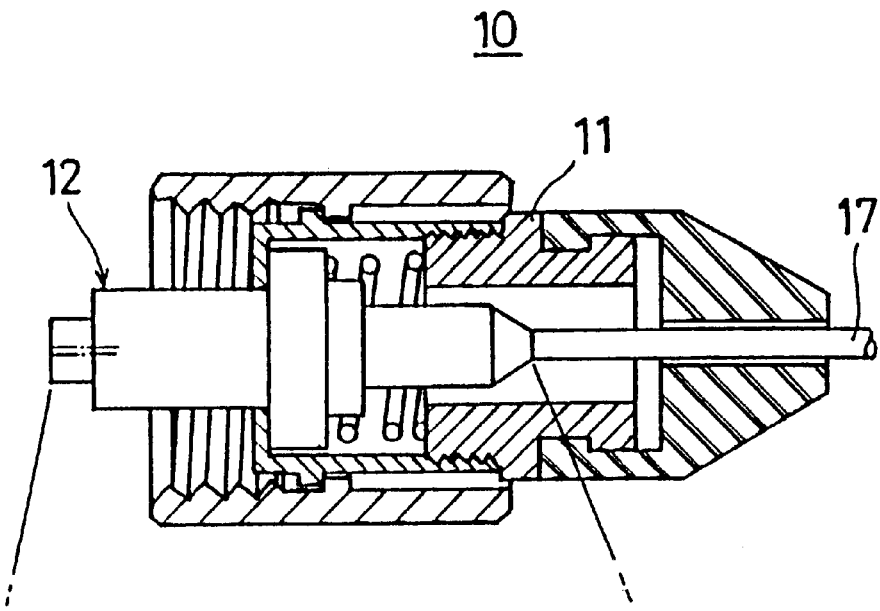
FIG. 1 shows a conventional optical connector in a disconnected state.
Figure 1B:
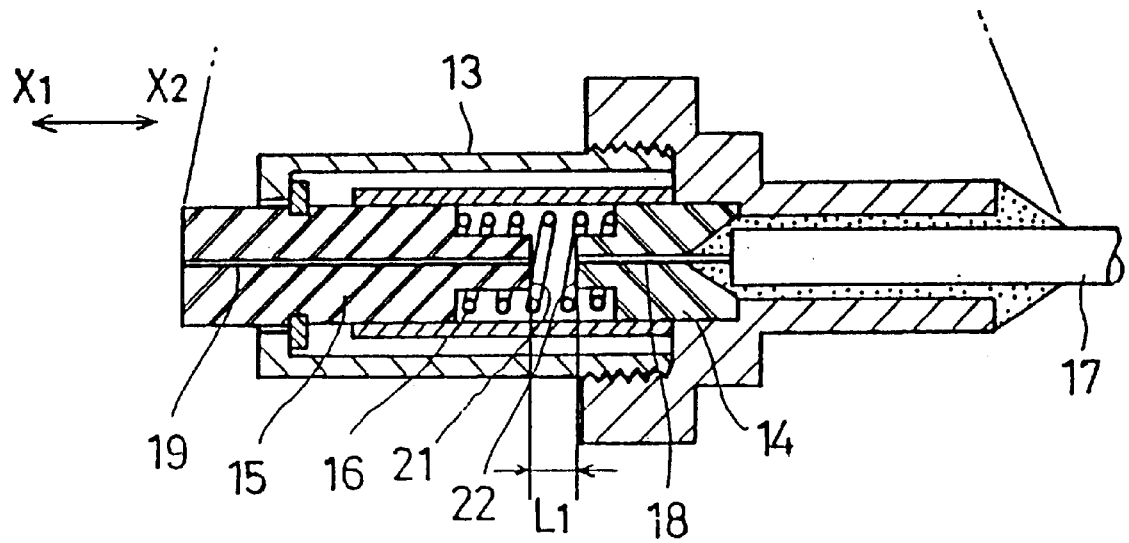
Figure 2:
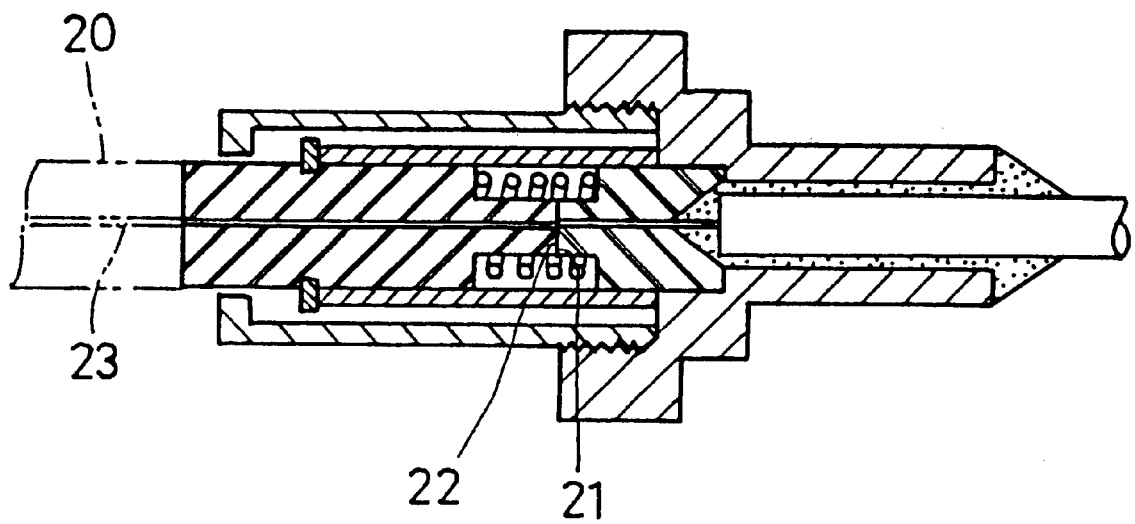
FIG. 2 shows the conventional optical connector in a connected state.
Figure 3:
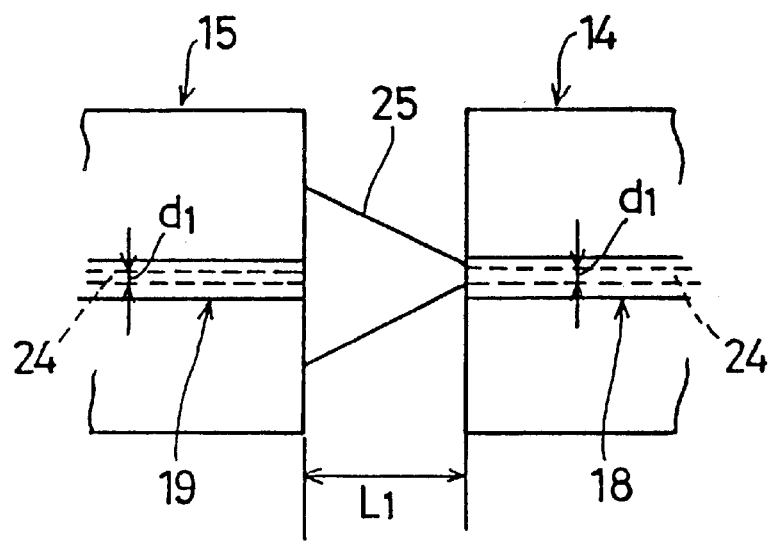
FIG. 3 shows how a laser beam is propagated when a generally used optical connector is disconnected.
Figure 4:
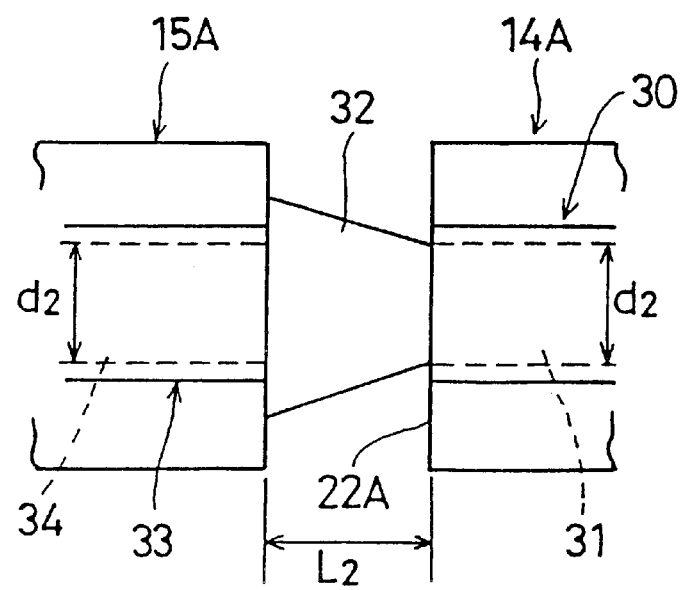
FIG. 4 shows how a laser beam is propagated when an optical connector used in a subscriber loop system is disconnected.
Figure 5A:
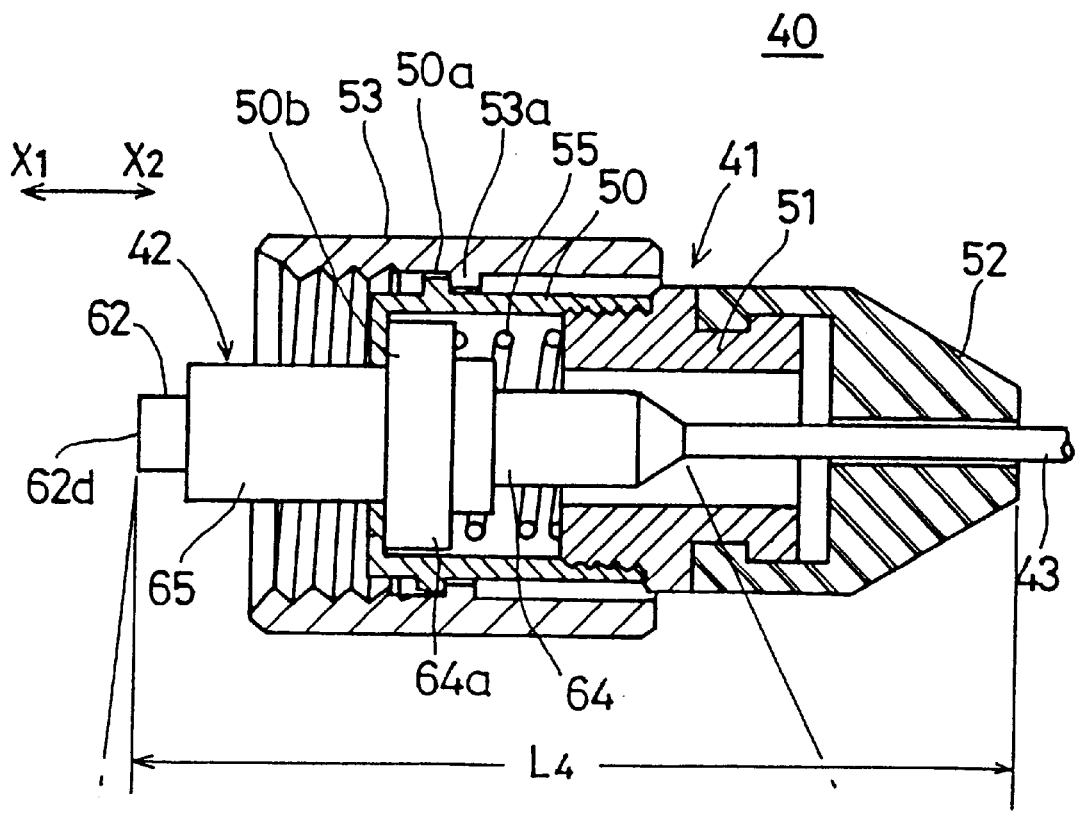
FIG. 5 shows an optical connector according to a first embodiment of the present invention.
Figure 5B:
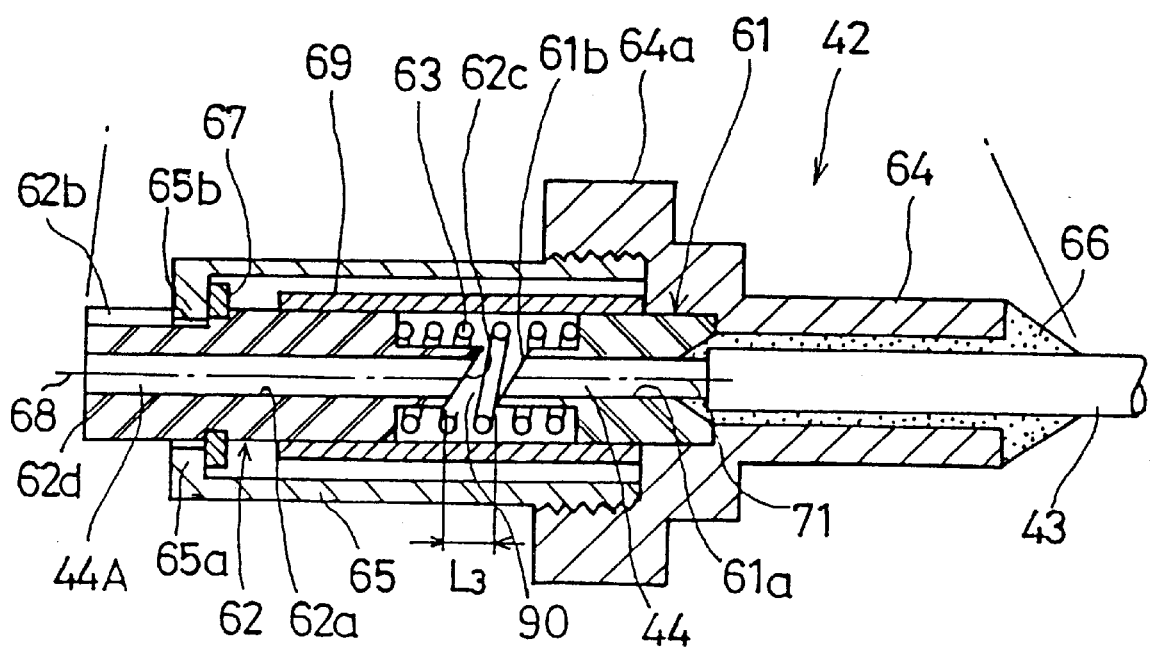
Figure 6:
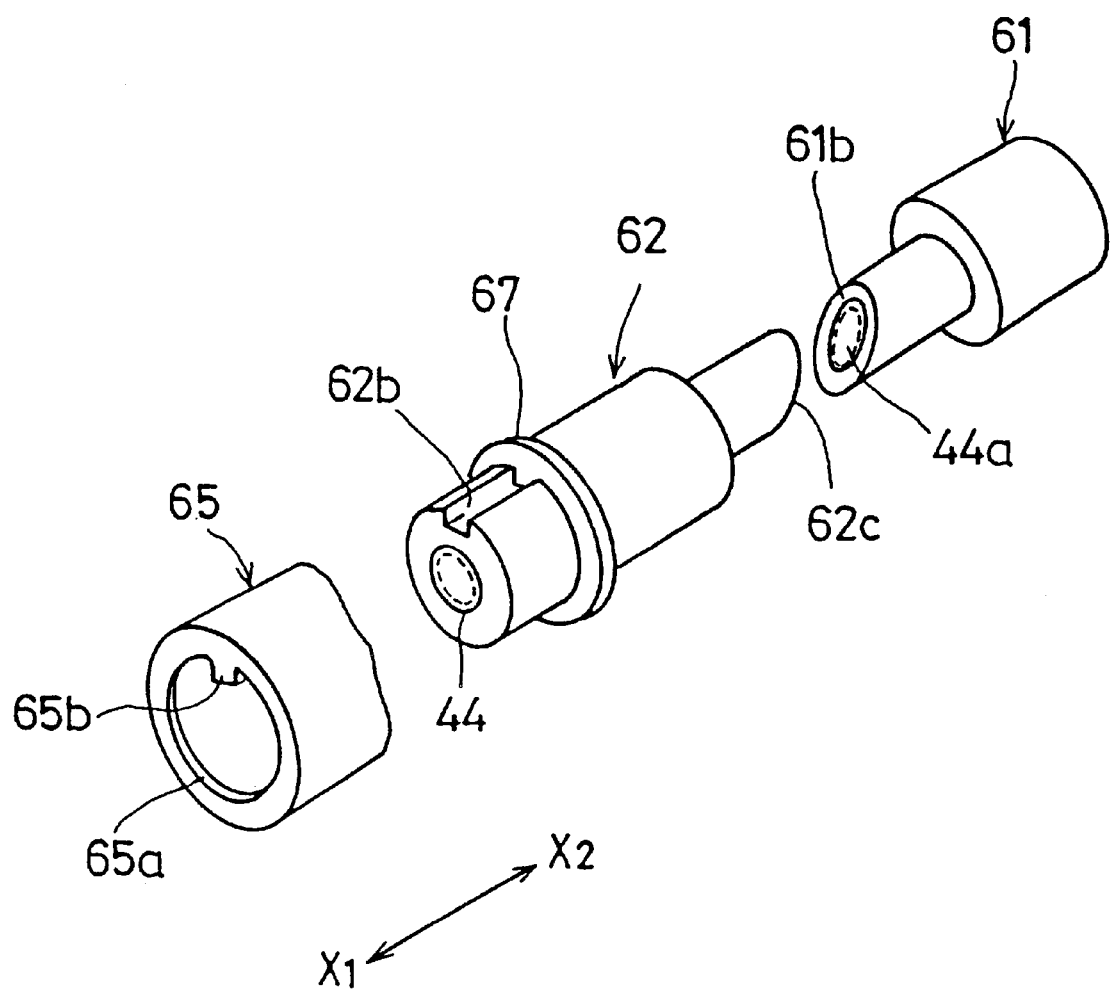
FIG. 6 is an exploded perspective view of a part of a ferrule composite of FIG. 5.

FIG. 5 shows an optical connector 40 according to a first embodiment of the present invention. The optical connector 40 is constructed such that a ferrule composite 42 is built into a generally cylindrical housing composite 41. The optical connector 40 is provided at an end of an optical fiber cord 43 in a subscriber loop system.

Figure 7:
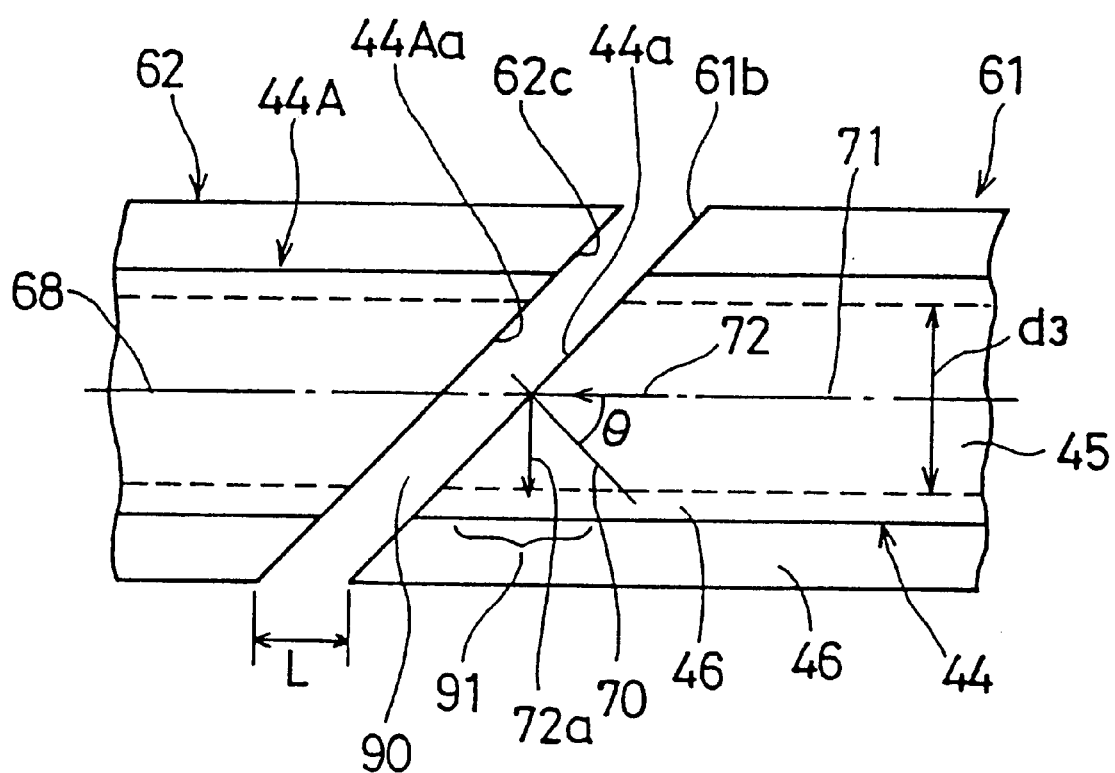
FIG. 7 shows how slanting end surfaces of a first ferrule and a second ferrule are separated from each other so that a laser light beam is totally reflected.

An optical fiber 44 of the optical fiber cord 43 used in the subscriber loop system is formed of a plastic such as a polycarbonate instead of a glass because the optical fiber cord 43 is adapted for a short-distance transmission of a laser beam. As shown in FIG. 7, a core 45 of the optical fiber 44 has a relatively large diameter d3 of about 1 mm.

The housing composite 41 is constructed such that a first housing 50 and a second housing 51 are secured to each other by screws, the second housing 51 being provided with a rubber bush 52 at the X2 end thereof, and a nut 53 being fitted to the first housing 50 to surround it. The first housing 50 has a flange 50a at the outer periphery thereof, and the nut 53 has at the periphery thereof a flange 53a for latching the flange 50a. The first housing 50 has at the X1 end thereof a flange 50b that extends toward the radial center of the optical connector 40.

The ferrule composite 42 provided at the end of the optical fiber cord 43 and housed in the first housing 50 is energized by a spring 55 in the X1 direction so as to be latched by the flange 50b.

The ferrule composite 42 is constructed such that a first ferrule 61, a second ferrule 62 and a coil spring 63 are accommodated in a housing 60. The coil spring 63 embodies energizing means as claimed in claim 1.

The housing 60 is constructed such that a generally cylindrical holder metal piece 64 and a sleeve 65 are coupled to each other by screws. The holder metal piece 64 has a flange 64a at the outer periphery thereof. The sleeve 65 has at the X1 end thereof a flange 65a that extends toward the radial center of the ferrule composite 42. The flange 65a has a projection 65b that extends toward the radial center of the ferrule composite 42.

The optical fiber 44 at the end of the optical fiber 43 is inserted into a central slot 61a of the first ferrule 61 and fixed therein. The first ferrule 61 is fixed inside the holder metal piece 64 by an adhesive 66 together with the optical fiber cord 43.

An optical fiber 44A similar to the optical fiber 44 is inserted into a central slot 62a of the second ferrule 62 and fixed therein. A C-washer 67 is fitted near the X1 end of the second ferrule 62. Beyond the C-washer 67, a groove 62b is formed on the surface of the second ferrule 62 further toward the X1 end thereof so as to be parallel with an axis 68 of the second ferrule 62.

A guide sleeve 69 inside the sleeve 65 is fixed to the outer periphery of the first ferrule 61.

The second ferrule 62 is fitted inside the guide sleeve 69 to be slidable in the X1 and X2 directions. The second ferrule 62 and the first ferrule 61 are arranged in series on the same axis such that the second ferrule 62 is nearer the X1 end of the ferrule composite 42. The second ferrule 62 is accommodated in the sleeve 65 such that its X1 end projects outside the sleeve 65. The groove 62b is engaged with the projection 65b so that the second ferrule 62 is prevented from being rotated. The groove 62b and the projection 65b embody rotation restricting means as claimed in claim 3.

The coil spring 63 is built in the guide sleeve 69 so as to lie between the first ferrule 61 and the second ferrule 62. A spring force of the coil spring 63 energizes the second ferrule 62 in the X1 direction so that the C-washer 67 comes butted against the flange 65b.

As shown in FIG. 7, the first ferrule 61 has a slanting end surface 61b. The end of the optical fiber 44 is exposed on the end surface 61a of the first ferrule 61 and has a slanting end surface 44a that is flush with the end surface 61b. A normal 70 of the slanting end surfaces 61b and 44a has an angle θ with respect to the axis 68 of the first ferrule 61, more strictly, with respect to a laser beam 72 transmitted through the core 45. The angle θ is set such that a condition sin θ≧1/n is met, wherein n indicates a refractive index of the core 45.

That is, the angle θ provides a total reflection of the laser beam 72 transmitted through the core 45 at the slanting end surface 44a. More specifically, the angle θ is set to approximately 42 degrees since the polycarbonate that forms the core 45 has a refractive index of 1.5–1.6.

The second ferrule 62 has at the end thereof facing the first ferrule 61 a slanting end surface 62c having the same angle as the slanting end surface 61b and slanting in the same direction. The end of the optical fiber 44A is exposed on the end surface 62c of the second ferrule 62 and has a slanting end surface 44Aa flush with the slanting end surface 62c.

The slanting end surfaces 61b, 44a, 62c and 44Aa are subjected to optical polishing.

A description will now be given of a connected state and a disconnected state of the optical connector 40.

Figure 8:
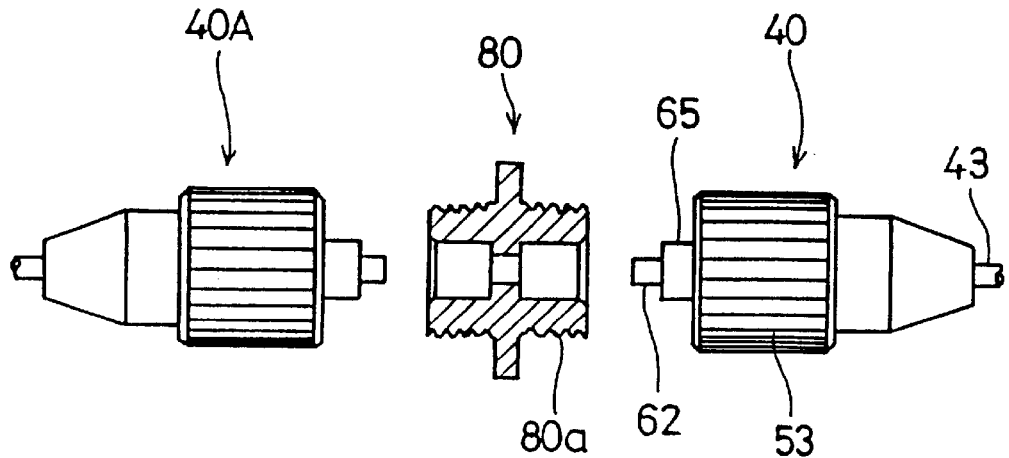
FIG. 8 shows how the optical connectors of FIG. 5 are connected to each other.

As shown in FIG. 8, the optical connector 40 is connected to another optical connector 40A using an adaptor 80. More specifically, the optical connector 40 and the optical connector 40A are inserted into the adaptor 80 from respective sides. By securing the nut 53 to a screw part 80a of the adaptor 80, the first housing 50 is drawn in the X1 direction while compressing the spring 55 so that the optical connector 40 and the optical connector 40A are coupled to each other via the adaptor 80.

Figure 9:
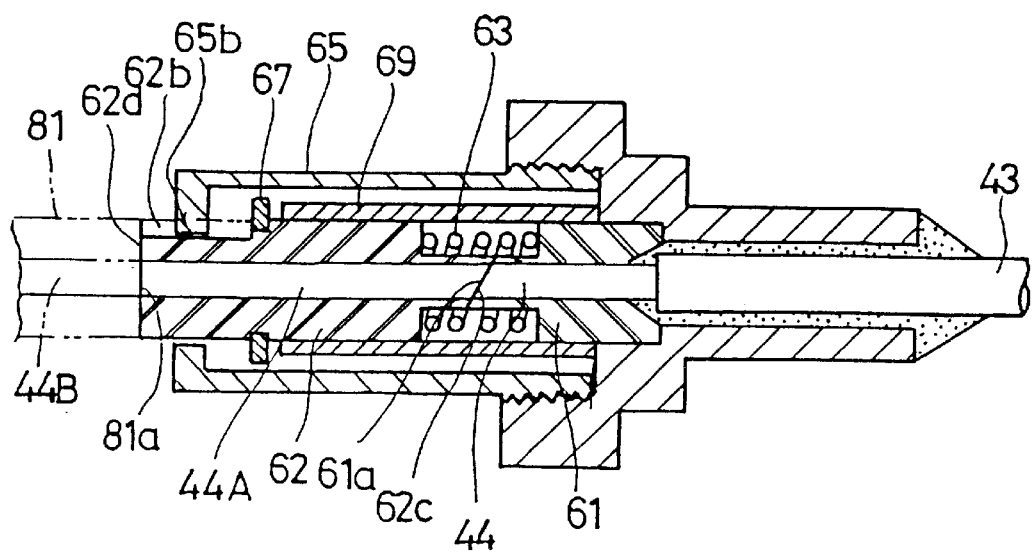
FIG. 9 shows a state of the first and second ferrules when the optical connectors are connected to each other.
Figure 10:
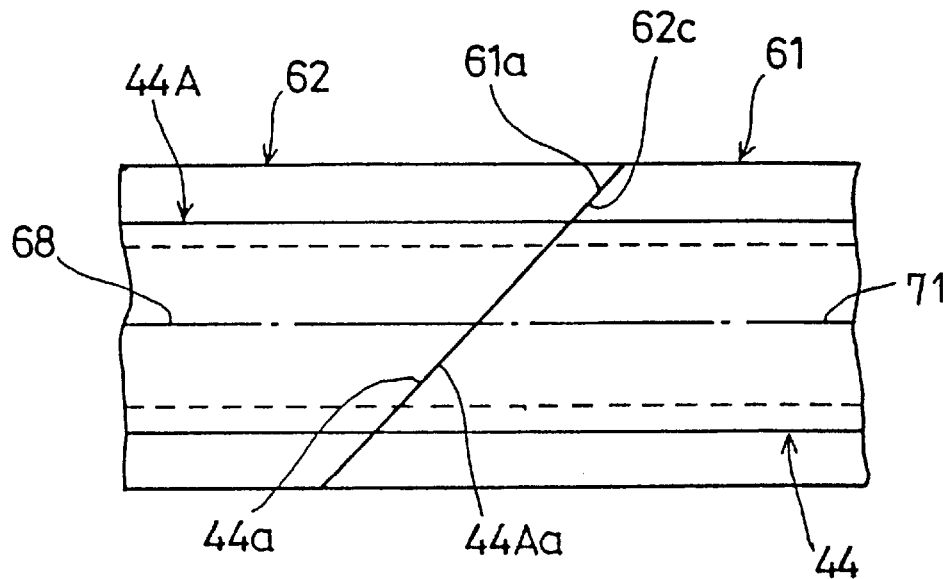
FIG. 10 is enlarged view showing how the first and second ferrules shown in FIG. 9 are in close contact with each other.

As shown in FIG. 9, an end surface 62d of the second ferrule 62 provided in the ferrule composite 42 of the optical connector 40 comes butted against an end surface 81a of a ferrule 81 inside the optical connector 40A so that the coil spring 63 is compressed and the second ferrule 62 is displaced in the X2 direction with respect to the sleeve 65. As a result, as shown in FIG. 10, the slanting end surface 62c of the second ferrule 62 comes into a close contact with the slanting end surface 61b of the first ferrule 61. Since the second ferrule 62 is not rotated and is guided by the guide sleeve 69, it is ensured that the slanting end surface 62c comes into a close contact with the slanting end surface 61b such that the axis 68 and the axis 71 are aligned with a high precision. Therefore, it is ensured that the optical fiber 44A are properly aligned with the optical fiber 44. Further, the slanting end surface 44Aa comes into a close contact with the slanting end surface of the optical fiber 44. Even if a gap is created between the slanting end surface 44a and the slanting end surface 44Aa, the gap is smaller than a wavelength of the laser beam 72.

With the above-described arrangement, the laser beam transmitted through the optical fiber cord 43 passes through the close contact portion and emerges from the optical fiber 44 into the optical fiber 44A. After passing through the optical fiber 44A, the beam enters an optical fiber 44B inside the ferrule 81 and transmitted forward.

When the nut 53 is loosened so as to disconnect the optical connector 40 from the adaptor 80, the ferrule composite 42 returns to the state shown in FIG. 5. More specifically, due to the spring force of the coil spring 63, the second ferrule 62 is displaced by a distance L3 in the X1 direction, that is, toward the outside of the sleeve 65, until the C-washer 67 comes butted against the flange 65a. For example, L3 is set to 0.1 mm. As shown in FIG. 7, as the second ferrule 62 is displaced, the slanting end surface 62c of the second ferrule 62 comes apart from the slanting end surface 61b of the first ferrule 61 so that the slanting end surface 44Aa of the optical fiber 44A comes apart from the slanting end surface 44a of the optical fiber 44. A gap 90 is created between the slanting end surface 44a of the optical fiber 44 and the slanting end surface 44Aa of the optical fiber 44A.

Referring to FIG. 7, the laser beam emerging from the semiconductor laser apparatus (light source) and transmitted through the optical fiber cord 43 is totally reflected by the slanting end surface 44a of the optical fiber 44. As indicated by the symbol 72a, the light beam 72 is directed toward the core of the optical fiber 44 and does not emerge into the gap 90.

Propagation of the light beam 72 is prohibited beyond the end of the first ferrule 61 so that no light beam emerges from the end surface 62d of the second ferrule 62. Therefore, no damage to the eyes is caused even when a lay person performs a disconnection of the optical connector 40 and looks into the end thereof. In this way, the present invention ensures a safe disconnection operation.

Referring back to FIG. 7, the portion of a clad 46 upon which portion the totally reflected laser beam 72 impinges is turned into a black part 91. Therefore, the laser beam 72 is properly absorbed by the black part 91 so that a return beam that travels backward through the optical fiber 44 is prevented from occurring. Thus, an unfavorable effect on optical communication is prevented. The black part 91 embodies light absorbing part as claimed in claim 2.

Since the distance L3 is as small as 0.1 mm, the optical connector 40 has a relatively short length L4 and is thus compact.

Figure 11:
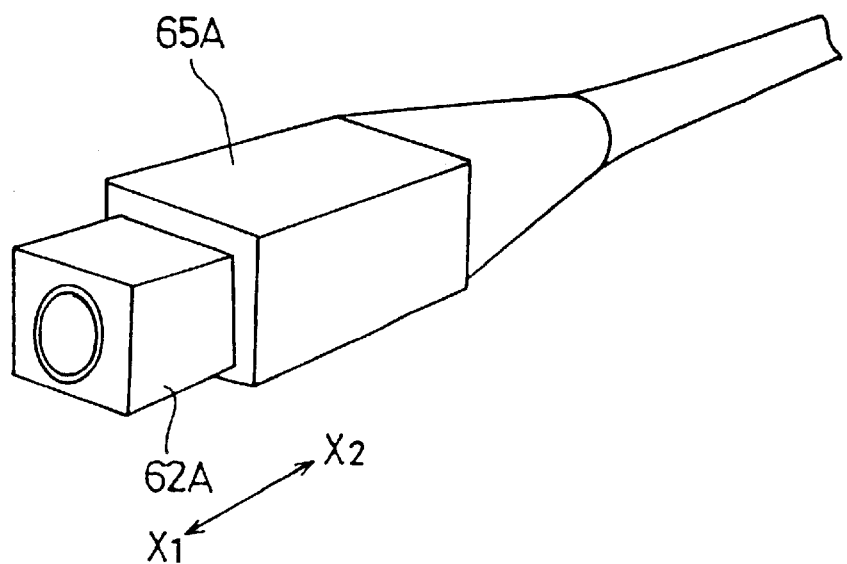
FIG. 11 shows a ferrule composite in an optical connector according to a second embodiment of the present invention.

FIG. 11 shows a ferrule composite 42A of the optical connector according to a second embodiment of the present invention. A second ferrule 62A generally has a shape of a quadratic prism. The second ferrule 62A is fitted inside the sleeve 65A having a rectangular cross-section and is prevented from being rotated.

Figure 12:
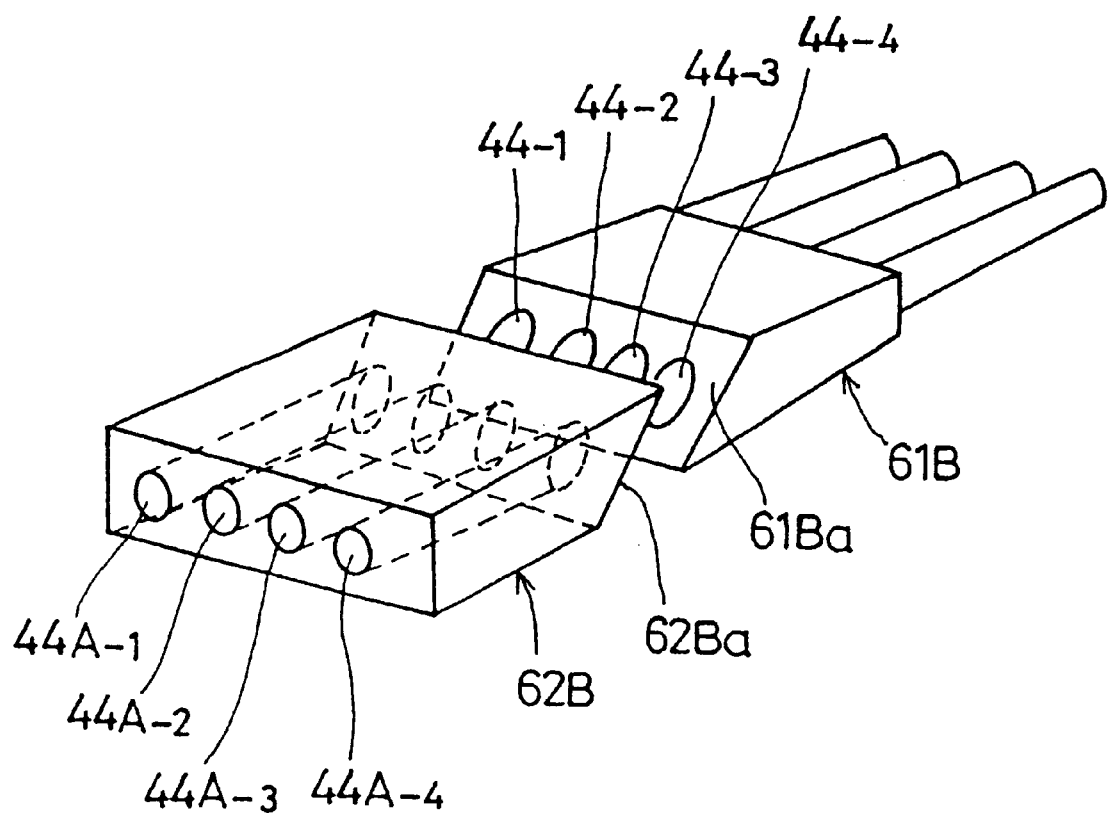
FIG. 12 shows an important part of a four-wire optical connector according to a third embodiment of the present invention.

FIG. 12 shows a first ferrule 61B and a second ferrule 62B of a four-wire optical connector according to a third embodiment of the present invention. The first ferrule 61B generally has a shape of a rectangular parallelepiped and has a slanting end surface 61Ba having an angle that satisfies a condition for total reflection. Four optical fibers 41-1–41-4 are fitted in the first ferrule 61B side by side. Similarly to the first ferrule 61B, the second ferrule 62B generally has a shape of a rectangular parallelepiped and has a slanting end surface 62Ba that corresponds to the slanting end surface 61Ba. Four optical fibers 41A-1–41A-4 are fitted in the second ferrule 62B side by side.

The present invention is not limited to the above described embodiments. For example, the present invention may be applied to a single-mode fiber. Variations and modifications may be made without departing from the scope of the present invention.

What is claimed is:

1. An optical connector comprising:

first and second optical fibers which each has a slanted end face, wherein the optical connector provides a connection state where the end face of the first optical fiber is aligned with, and in close contact with, the end face of the second optical fiber so that light travelling through the first optical fiber travels into the second optical fiber, the optical connector provides a disconnection state where a gap exists between the end face of the first optical fiber and the end face of the second optical fiber, the end face of the first optical fiber causing light travelling through the first optical fiber to experience total internal reflection at the end face of the first optical fiber when in the disconnection state, the first optical fiber has a core with a refractive index equal to or below 1.6, and light travels through the core in a travelling direction, and a normal passing through the end face of the first optical fiber forms an approximately 42° angle with respect to the travelling direction of light through the core.

2. An optical connector comprising:

a first optical fiber having a core through which light travels in a travelling direction, the first optical fiber having an end face which is slanted so that a normal passing through the end face forms an angle θ with respect to the travelling direction of light through the core with sin θ ≧ 1/n, where n is a refractive index of the core;

a second optical fiber having an end face; and a connection mechanism which provides a connection state where the end face of the first optical fiber is in close contact with the end face of the second optical fiber so that light travelling through the first optical fiber travels into the second optical fiber, and a disconnection state where an air gap exists between the end face of the first optical fiber and the end face of the second optical fiber, the end face of the first optical fiber thereby causing light travelling through the first optical fiber to experience total internal reflection at the end face of the first optical fiber when in the disconnection state, wherein, when in the disconnection state, light experiencing total internal reflection at the end face of the first optical fiber is incident on a portion of the first optical fiber, said portion being a light absorbing part which absorbs the incident light.

3. An optical connector comprising:

first and second optical fibers which each has a slanted end face, wherein the optical connector provides a connection state where the end face of the first optical fiber is aligned with, and in close contact with, the end face of the second optical fiber so that light travelling through the first optical fiber travels into the second optical fiber, the optical connector provides a disconnection state where a gap exists between the end face of the first optical fiber and the end face of the second optical fiber, the end face of the first optical fiber causing light travelling through the first optical fiber to experience total internal reflection at the end face of the first optical fiber when in the disconnection state, and, in the disconnection state, the gap is of uniform width between the end faces of the first and second optical fibers.

4. An optical connector comprising:

first and second optical fibers which each has a slanted end face, wherein the optical connector provides a connection state where the end face of the first optical fiber is aligned with, and in close contact with, the end face of the second optical fiber so that light travelling through the first optical fiber travels into the second optical fiber, and the optical connector provides a disconnection state where a gap exists between the end face of the first optical fiber and the end face of the second optical fiber, the end face of the first optical fiber causing light travelling through the first optical fiber to experience total internal reflection at the end face of the first optical fiber when in the disconnection state;

a housing device which houses the end faces of the first and second optical fibers so that, in the connection state, the end faces are enclosed by the housing device and, in the disconnection state, the end faces and the gap are enclosed by the housing device, wherein, in the disconnection state, the gap is of uniform width between the end faces of the first and second optical fibers.

5. An optical connector comprising:

a first optical fiber having a core through which light travels in a travelling direction, the first optical fiber having an end face which is slanted so that a normal passing through the end face forms an angle θ with respect to the travelling direction of light through the core with sin θ ≧ 1/n, where n is a refractive index of the core;

a second optical fiber having an end face, and a connection mechanism which provides a connection state where the end face of the first optical fiber is in close contact with the end face of the second optical fiber so that light travelling through the first optical fiber travels into the second optical fiber, and a disconnection state where an air gap exists between the end face of the first optical fiber and the end face of the second optical fiber, the end face of the first optical fiber thereby causing light travelling through the first optical fiber to experience total internal reflection at the end face of the first optical fiber when in the disconnection state, wherein, in the disconnection state, the gap is of uniform width between the end faces of the first and second optical fibers.

6. An optical connector comprising:

a first optical fiber having a core through which light travels in a travelling direction, the first optical fiber having an end face which is slanted so that a normal passing through the end face forms an angle θ with respect to the travelling direction of light through the core with sin θ ≧ 1/n, where n is a refractive index of the core;

a second optical fiber having an end face; and a connection mechanism which provides a connection state where the end face of the first optical fiber is in close contact with the end face of the second optical fiber so that light travelling through the first optical fiber travels into the second optical fiber, and a disconnection state where an air gap exists between the end face of the first optical fiber and the end face of the second optical fiber, the end face of the first optical fiber thereby causing light travelling through the first optical fiber to experience total internal reflection at the end face of the first optical fiber when in the disconnection state, wherein the optical connector is changeable between the connection state and the disconnection state by moving at least one of the first and second optical fibers in the axial direction, and, in the disconnection state, the gap is of uniform width between the end faces of the first and second optical fibers.

7. An optical connector comprising:

first and second optical fibers which each has a slanted end face, wherein the optical connector provides a connection state where the end face of the first optical fiber is aligned with, and in close contact with, the end face of the second optical fiber so that light travelling through the first optical fiber travels into the second optical fiber, and the optical connector provides a disconnection state where a uniform width gap exists between the end face of the first optical fiber and the end face of the second optical fiber, the end face of the first optical fiber causing light travelling through the first optical fiber to be totally reflected at the end face of the first optical fiber when in the disconnection state.

8. An optical connector as in claim 7, wherein the first optical fiber has a core and light travels through the core in a travelling direction, and a normal passing through the end face of the first optical fiber forms an angle θ with respect to the travelling direction of light through the core so that sin θ ≧ 1/n, where n is a refractive index of the core of the first optical fiber.

9. An optical connector as in claim 7, wherein the first optical fiber has a core with a refractive index equal to or below 1.6, and light travels through the core in a travelling direction, and a normal passing through the end face of the first optical fiber forms an approximately 42° angle with respect to the travelling direction of light through the core.

10. An optical connector as in claim 7, further comprising:

a first ferrule which holds the first optical fiber and has a slanted end face aligned with, and in the same plane as, the end face of the first optical fiber; and a second ferrule which holds the second optical fiber and has a slanted end face aligned with, and in the same plane as, the end face of the second optical fiber, wherein the end face of the first ferrule is aligned with the end face of the second ferrule.

11. An optical connector as in claim 10, wherein, when the optical connector provides the connection state, the end face of the first ferrule is aligned with, and in close contact with, the end face of the second ferrule so that substantially no gap exists between the end faces of the first and second optical fibers.

12. An optical connector as in claim 10, further comprising:

a spring exerting a force which separates the first and second ferrules when the optical connector provides the disconnection state.

13. An optical connector as in claim 7, wherein the optical connector is changeable between the connection state and the disconnection state by moving at least one of the first and second optical fibers in the axial direction.

14. An optical connector comprising:

a first optical fiber having a core through which light travels in a travelling direction, the first optical fiber having an end face which is slanted so that a normal passing through the end face forms an angle θ with respect to the travelling direction of light through the core with sin θ ≧ 1/n, where n is a refractive index of the core;

a second optical fiber having an end face; and a connection mechanism which provides a connection state where the end face of the first optical fiber is in close contact with the end face of the second optical fiber so that light travelling through the first optical fiber travels into the second optical fiber, and a disconnection state where a uniform width air gap exists between the end face of the first optical fiber and the end face of the second optical fiber, the end face of the first optical fiber thereby causing light travelling through the first optical fiber to be totally reflected at the end face of the first optical fiber when in the disconnection state.

15. An optical connector as in claim 14, wherein, when in the disconnection state, light totally reflected at the end face of the first optical fiber is incident on a portion of the first optical fiber, said portion being a light absorbing part which absorbs the incident light.

16. An optical connector as in claim 14, further comprising:

a housing device which houses the end faces of the first and second optical fibers so that, in the connection state, the end faces are enclosed by the housing device and, in the disconnection state, the end faces and the gap are enclosed by the housing device.

17. An optical connector as in claim 16, wherein the first optical fiber has first and second ends, said end face of the first optical fiber being an end face of the first end, and the second end of the first optical fiber for connection to a third optical fiber, and the second end of the first optical fiber is outside of the housing device.

18. An optical connector as in claim 14, wherein the optical connector is changeable between the connection state and the disconnection state by moving at least one of the first and second optical fibers in the axial direction.

19. An optical connector comprising:

a first optical fiber having a core through which light travels in a travelling direction, the first optical fiber having an end face which is slanted so that a normal passing through the end face forms an angle θ with respect to the travelling direction of light through the core with sin θ ≧ 1/n, where n is a refractive index of the core;

a second optical fiber having an end face; and a connection mechanism which provides
- a connection state where the end face of the first optical fiber is in close contact with the end face of the second optical fiber so that light travelling through the first optical fiber travels into the second optical fiber, and
- a disconnection state where an air gap exists between the end face of the first optical fiber and the end face of the second optical fiber, the end face of the first optical fiber thereby causing light travelling through the first optical fiber to be totally reflected at the end face of the first optical fiber when in the disconnection state, wherein, when in the disconnection state, light totally reflected at the end face of the first optical fiber is incident on a portion of the first optical fiber, said portion being a light absorbing part which absorbs the incident light.

20. An optical connector comprising:

first and second optical fibers which each has a slanted end face, wherein
- the optical connector provides a connection state where the end face of the first optical fiber is aligned with, and in close contact with, the end face of the second optical fiber so that light travelling through the first optical fiber travels into the second optical fiber,
- the optical connector provides a disconnection state where a gap exists between the end face of the first optical fiber and the end face of the second optical fiber, the end face of the first optical fiber causing light travelling through the first optical fiber to be totally reflected at the end face of the first optical fiber when in the disconnection state, and,
- in the disconnection state, the gap is of uniform width between the end faces of the first and second optical fibers.

21. An optical connector comprising:

first and second optical fibers which each has a slanted end face, wherein
- the optical connector provides a connection state where the end face of the first optical fiber is aligned with, and in close contact with, the end face of the second optical fiber so that light travelling through the first optical fiber travels into the second optical fiber,
- the optical connector provides a disconnection state where a gap exists between the end face of the first optical fiber and the end face of the second optical fiber, the end face of the first optical fiber causing light travelling through the first optical fiber to be totally reflected at the end face of the first optical fiber when in the disconnection state,
- the optical connector further comprising a housing device which houses the end faces of the first and second optical fibers so that, in the connection state, the end faces are enclosed by the housing device and, in the disconnection state, the end faces and the gap are enclosed by the housing device, and
- in the disconnection state, the gap is of uniform width between the end faces of the first and second optical fibers.

22. An optical connector comprising:

a first optical fiber having a core through which light travels in a travelling direction, the first optical fiber having an end face which is slanted so that a normal passing through the end face forms an angle θ with respect to the travelling direction of light through the core with sin θ ≧ 1/n, where n is a refractive index of the core;

a second optical fiber having an end face;

a connection mechanism which provides
- a connection state where the end face of the first optical fiber is in close contact with the end face of the second optical fiber so that light travelling through the first optical fiber travels into the second optical fiber, and
- a disconnection state where an air gap exists between the end face of the first optical fiber and the end face of the second optical fiber, the end face of the first optical fiber thereby causing light travelling through the first optical fiber to be totally reflected at the end face of the first optical fiber when in the disconnection state, wherein, in the disconnection state, the gap is of uniform width between the end faces of the first and second optical fibers.

23. An optical connector comprising:

a first optical fiber having a core through which light travels in a travelling direction, the first optical fiber having an end face which is slanted so that a normal passing through the end face forms an angle θ with respect to the travelling direction of light through the core with sin θ ≧ 1/n, where n is a refractive index of the core;

a second optical fiber having an end face; and a connection mechanism which provides
- a connection state where the end face of the first optical fiber is in close contact with the end face of the second optical fiber so that light travelling through the first optical fiber travels into the second optical fiber, and
- a disconnection state where an air gap exists between the end face of the first optical fiber and the end face of the second optical fiber, the end face of the first optical fiber thereby causing light travelling through the first optical fiber to be totally reflected at the end face of the first optical fiber when in the disconnection state, wherein
  - the optical connector is changeable between the connection state and the disconnection state by moving at least one of the first and second optical fibers in the axial direction, and,
  - in the disconnection state, the gap is of uniform width between the end faces of the first and second optical fibers.

24. An optical connector comprising:

first and second optical fibers which each has a slanted end face, wherein
- the optical connector provides a connection state where the end face of the first optical fiber is aligned with, and in close contact with, the end face of the second optical fiber so that light travelling through the first optical fiber travels into the second optical fiber,
- the optical connector provides a disconnection state where a gap exists between the end face of the first optical fiber and the end face of the second optical fiber, the end face of the first optical fiber causing light travelling through the first optical fiber to be totally reflected at the end face of the first optical fiber when in the disconnection state, the first optical fiber has a core and light travels through the core in a travelling direction, a normal passing through the end face of the first optical fiber forms an angle $\theta$ with respect to the travelling direction of light through the core so that $\sin\theta \geq 1/n$, where n is a refractive index of the core of the first optical fiber, and the first optical fiber has a core with a refractive index equal to or below 1.6, and light travels through the core in a travelling direction, and a normal passing through the end face of the first optical fiber forms an approximately 42° angle with respect to the travelling direction of light through the core.

* * * * *